United States Patent [19]
Tracy et al.

[11] Patent Number: 5,960,772
[45] Date of Patent: Oct. 5, 1999

[54] APPARATUS AND METHOD FOR KNOCK DETECTION IN INTERNAL COMBUSTION ENGINES

[75] Inventors: Lawrence P. Tracy, Columbus; Gary W. Ream, Hope; Kenneth R. Stevens, Franklin, all of Ind.

[73] Assignee: Cummins Engine Company, Inc., Columbus, Ind.

[21] Appl. No.: 09/093,267

[22] Filed: Jun. 8, 1998

[51] Int. Cl.$^6$ ................................ F02P 5/15; G01L 23/22
[52] U.S. Cl. ...................................... 123/406.4; 73/35.11
[58] Field of Search ........................ 123/406.21, 406.37, 123/406.4, 435; 73/35.01, 35.03–35.13

[56] References Cited

U.S. PATENT DOCUMENTS

| | | | |
|---|---|---|---|
| 4,408,479 | 10/1983 | Asai et al. | 73/35.13 |
| 5,027,775 | 7/1991 | Iwata | 123/406.21 |

*Primary Examiner*—Tony M. Argenbright
*Attorney, Agent, or Firm*—Woodard, Emhardt, Naughton, Moriarty & McNett

[57] ABSTRACT

The present invention provides a knock sensing system for an internal combustion engine which utilizes only a single knock sensor associated with one of the engine cylinders. Operation of the engine is controlled such that the cylinder which is equipped with a knock sensor will be the first cylinder to experience combustion knock as compared to the remaining engine cylinders. This can be done by various methods, such as advancing the ignition timing on the designated cylinder. The knock sensor is then monitored by the engine control module in order to sense premature detonation on the designated cylinder, knowing that it is highly unlikely that knocking will occur on the other engine cylinders if knocking is not occurring on the designated cylinder. When knocking is sensed, appropriate action, such as shutting down the engine, may be taken by the engine control module. The knock sensor is preferably mounted to a capscrew which couples the intake manifold to the cylinder head.

20 Claims, 3 Drawing Sheets

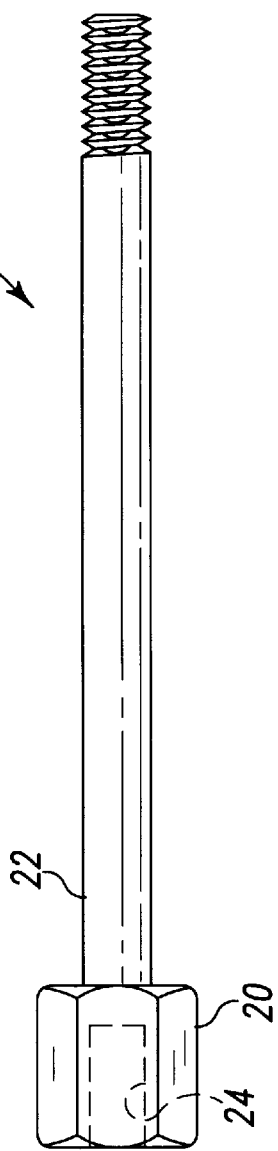
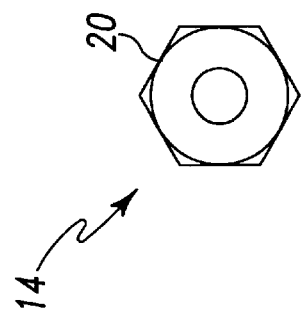
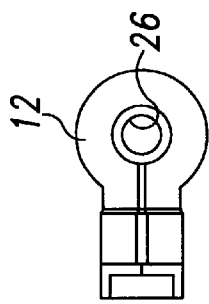
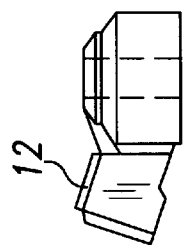
Fig. 3A  Fig. 3B
Fig. 4A  Fig. 4B

APPARATUS AND METHOD FOR KNOCK DETECTION IN INTERNAL COMBUSTION ENGINES

TECHNICAL FIELD OF THE INVENTION

The present invention generally relates to internal combustion engines and, more particularly, to an apparatus and method for knock detection in internal combustion engines.

BACKGROUND OF THE INVENTION

Premature detonation, pre-ignition, or combustion knock, occurs in internal combustion engines when the air/fuel mixture is being compressed by the engine cylinder and the compression temperature causes auto-ignition of the air/fuel mixture prior to ignition of the spark plug for that cylinder. Combustion knock can also occur when some or all of the air fuel mixture in the combustion chamber auto-ignites, or detonates, due to excessive in-cylinder compression temperature. Such knocking can cause severe damage to an engine as the pressure wave from the knock destroys the cylinder thermal boundary layer, causing the cylinder and piston to reach temperatures near the actual temperature of combustion. In an engine, this elevated temperature, combined with the pressure wave from the knock, can blow chunks off of the piston crown, which has a melting point much lower than the temperature of combustion. Even in engines with iron cylinder liners which can withstand the elevated temperatures, the piston rings in contact with the liners cannot withstand these temperatures and will fail. Allowing an engine to operate under a knocking condition can therefore lead to catastrophic engine damage.

Natural gas fueled engines are very prone to pre-ignition or detonation damage from a variety of means, such as overfueling, variation in fuel quality (i.e., high BTU fuel), elevated compression ratio due to combustion chamber deposit buildup, too much spark timing advance, etc. Before electronically controlled engines were developed, this problem was compensated for with low BMEP (power density) ratings and low compression ratios. This resulted in large engines with very low power densities, which translated into high initial costs and high continuous operating costs.

In order to achieve small package sizes and good operating efficiencies, modern electronically-controlled engines are typically designed as high BMEP, lean burn engines which have comparatively low detonation margins. It is generally considered imperative that such engines utilize a knock sensor in order to shut down the engine if dangerous knocking occurs.

Standard automotive gasoline engine knock protection systems generally utilize a single sensor mounted on the engine block in order to detect knocking in any engine cylinder. Such sensors typically sense vibration energy transmitted to the engine block from the premature detonation in any engine cylinder. Alternatively, such sensors can be mounted on the engine cylinder head in these engines. Such a knock sensor mounting arrangement is not feasible on natural gas fueled engines which utilize wet sleeve replaceable cylinder liners. In this system, the water jacket of the engine block is in contact with the outer surface of the cylinder liners and the contact points between the cylinder liners and the engine block have rubber seals therebetween. These seals and the engine water jacket effectively dampen the vibrations produced by premature detonation, such that these vibrations cannot be adequately sensed by a single sensor placed on the engine block or cylinder head. Furthermore, such engines typically have individual cylinder heads for each cylinder, further isolating the vibration energy transmission paths.

In order to provide knock detection on such natural gas fueled engines, prior art systems typically utilize a single knock sensor for each individual cylinder, typically mounted on the cylinder head. Such a design translates to relatively high cost and large space requirements for these systems. There is therefore a need for a knock sensor system for natural gas engines with wet sleeve replaceable cylinder liners that does not require a knock sensor for every engine cylinder. The present invention is directed toward meeting this need.

SUMMARY OF THE INVENTION

The present invention provides a knock sensing system for an internal combustion engine which utilizes only a single knock sensor associated with one of the engine cylinders. Operation of the engine is controlled such that the cylinder which is equipped with a knock sensor will be the first cylinder to experience premature detonation as compared to the remaining engine cylinders. This can be done by various methods, such as advancing the ignition timing on the designated cylinder. The knock sensor is then monitored by the engine control module in order to sense premature detonation on the designated cylinder, knowing that it is highly unlikely that knocking will occur on the other engine cylinders if knocking is not occurring on the designated cylinder. When knocking is sensed, appropriate action, such as shutting down the engine, or retarding spark timing, may be taken by the engine control module. The knock sensor is preferably mounted to a capscrew which couples the intake manifold to the cylinder head.

In one form of the invention, a method for knock detection in an internal combustion engine is disclosed comprising: providing an internal combustion engine having a plurality of cylinders, each said cylinder having a wet sleeve replaceable cylinder liner; providing a knock sensor operable to detect vibrational energy produced by knocking; applying said knock sensor to said engine in a vicinity of one of said plurality of cylinders such that said knock sensor will produce a first output when knocking occurs in said one cylinder; operating said engine in a manner such that said one cylinder is more prone to knock than any other of said plurality of cylinders; monitoring said knock sensor; and changing an operating state of said engine if said knock detector produces said first output.

In another form of the invention, an apparatus for knock detection is disclosed, comprising: an internal combustion engine having a plurality of cylinders, each said cylinder having a wet sleeve replaceable cylinder liner; an ignition system coupled to said engine for supplying a timed spark discharge to each of said plurality of cylinders, wherein an ignition timing of one of said plurality of cylinders is advanced with respect to any other of said plurality of cylinders, such that said one cylinder is more prone to knock than any other of said plurality of cylinders; a knock sensor coupled to said engine in a vicinity of said one cylinder such that said knock sensor is operable to detect vibrational energy produced by knocking in said one cylinder and to produce a first output in response thereto; and an engine control module coupled to said knock sensor and operable to detect said first output and further coupled to said engine for controlling an operating state of said engine; wherein said engine control module is operable to change said operating state in response to detecting said first output.

In another form of the invention, an apparatus for knock detection is disclosed, comprising an internal combustion engine having a plurality of cylinders, each said cylinder having a wet sleeve replaceable cylinder liner; a turbocharger having a divided turbine housing having first and second exhaust inlet sections, wherein said first housing section is wastegated and said second housing section is non-wastegated; a first exhaust manifold coupling a first group of said plurality of cylinders to said first housing section for flow of first exhaust gases; a second exhaust manifold coupling a second group of said plurality of cylinders to said second housing section for flow of second exhaust gases; a knock sensor coupled to said engine in a vicinity of said second group of cylinders such that said knock sensor is operable to detect vibrational energy produced by knocking in at least one of said second group of cylinders and to produce a first output response thereto; and an engine control module coupled to said knock sensor and operable to detect said first output, and further coupled to said engine for controlling an operating state of said engine; wherein said engine control module is operable to change said operating state in response to detecting said first output.

BRIEF DESCRIPTION OF THE DRAWINGS

FIG. 3A is a top plan view of a mounting adapter for the knock sensor of the present invention.

FIG. 3B is a side elevational view of the mounting adapter of FIG. 2A.

FIG. 4A is a side elevational view of a knock sensor of the present invention.

FIG. 4B is a top plan view of the knock sensor of FIG. 3A.

DESCRIPTION OF THE PREFERRED EMBODIMENT

Figure 1:
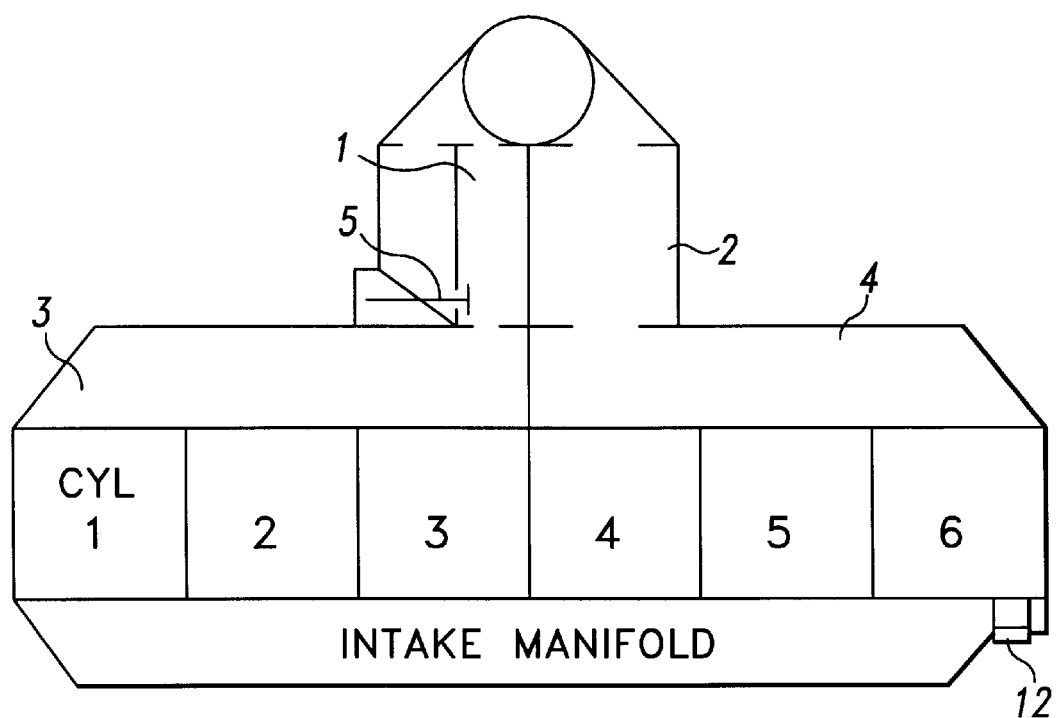
FIG. 1 is a block diagram of the top view of a turbocharged, 6-cylinder engine with a knock detection system of the present invention installed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
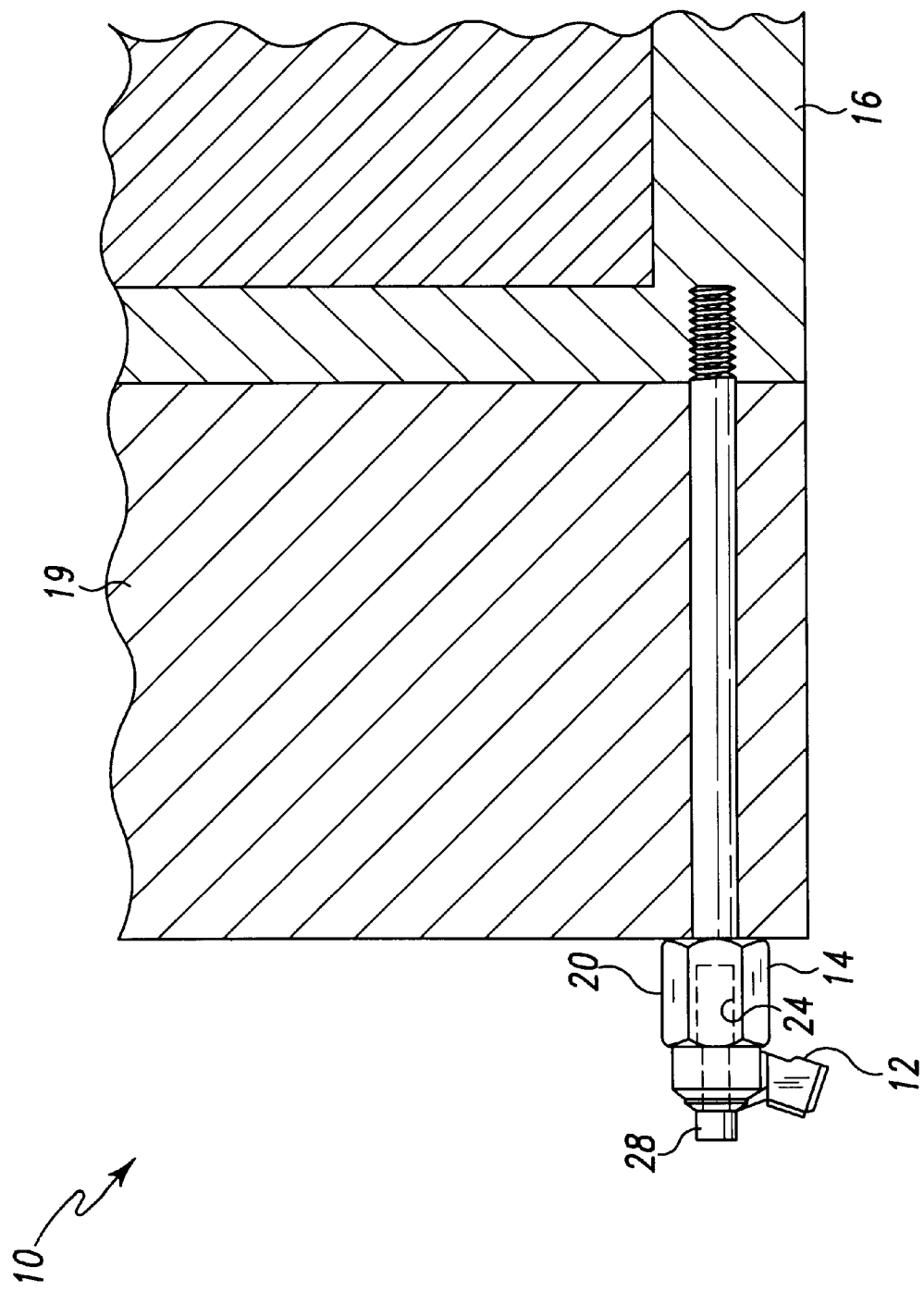
FIG. 2 is a schematic, partial cross-sectional view of a knock sensor of the present invention mounted to an engine cylinder head and associated intake manifold.

Referring to FIG. 2, there is illustrated, in a partial, cross-sectional view, a preferred embodiment knock sensor arrangement of the present invention mounted to an engine cylinder head, and indicated generally at 10. The knock sensor system 10 is implemented on only one cylinder of a multi-cylinder internal combustion engine. In order for this scheme to be viable in an engine utilizing wet sleeve replaceable cylinder liners, it is necessary to ensure that the cylinder equipped with the knock sensor will always experience knocking before any of the other engine cylinders. In this manner, the knocking can be sensed immediately and corrective action may be taken before reoccurrence of the knocking. In a preferred embodiment of the present invention, the knock sensor system 10 is installed on cylinder number 6 of a six cylinder turbocharged natural gas fueled engine.

Referring to FIG. 1, the turbocharger on the engine of the preferred embodiment utilizes a divided turbine housing having a separate exhaust gas inlet 1 for cylinders 1–3 and inlet 2 for cylinders 4–6. Therefore, the exhaust gases produced by cylinders 1–3 are combined in a first exhaust manifold runner 3 and applied to the first turbocharger turbine inlet 1, while the exhaust gases produced by cylinders 4–6 are combined in a second exhaust manifold runner 4 and applied to the second turbocharger turbine inlet 2. Furthermore, the turbine inlet 1 for cylinders 1–3 incorporates a wastegate 5 to limit the pressure of the exhaust gases applied to the turbocharger (as is known in the art). The turbine inlet 2 for cylinders 4–6 does not include such a wastegate.

Because of the wastegate 5 incorporated in the exhaust flow path for cylinders 1—3, these cylinders have to do less pumping work than cylinders 4–6 in order to get the same air flow through each cylinder. Because of this, the indicated mean effective pressure (IMEP) for cylinders 4–6 is higher than for cylinders 1–3, therefore there is a higher tendency for cylinders 4–6 to knock as compared to the wastegated cylinders 1–3.

As between the cylinders 4–6, it is further desired that one of these cylinders (the cylinder which has the knock sensor attached thereto) be made more prone to knock than the other two cylinders. In the preferred embodiment of the present invention, the knock sensor system 10 is coupled to cylinder number 6. In order to ensure that cylinder number 6 will begin knocking before either cylinder number 4 or cylinder number 5, the ignition timing for cylinder number 6 is advanced two degrees as compared to the other cylinders. Furthermore, the engine of the preferred embodiment utilizes an upstream, low pressure natural gas fuel system which ensures equal air/fuel ratio at all engine cylinders. It will therefore be recognized by those having ordinary skill in the art that cylinder number 6 in the engine of the preferred embodiment is much more prone to knocking than any of the other cylinders. Of course, other methods may be employed in any internal combustion engine in order to make one of the cylinders more prone to knocking than the other cylinders, such as increased compression ratio, increased exhaust flow restriction, or a fuel system biased to deliver more fuel to the knock sensor-instrumented cylinder. The present invention comprehends such other methods.

With the above-described engine set up, particularly the two degrees of ignition timing advance, it is fairly certain that cylinder number 6 will knock before any other engine cylinder. Therefore, the knock sensor 10 of FIG. 2 is applied to the cylinder head for cylinder number 6. The system 10 includes a knock sensor 12 which is mounted to a mounting adapter capscrew 14. The mounting adapter capscrew 14 is in turn mounted to the cylinder head combustion deck 16 at the point where the intake manifold 19 couples thereto.

The knock sensor 12 is illustrated in greater detail in FIGS. 4A–B. In a preferred embodiment of the present invention, the knock sensor 12 comprises a piezoelectric vibration sensor available from Robert Bosch GmtbH of Stuttgart, Germany (part number 0-261-231-128). The piezoelectric sensor produces a voltage output which is proportional to the vibration energy sensed by the knock sensor 12. Because the knock sensor 12 is coupled to the cylinder head of cylinder number 6, this sensor output will also be proportional to the detonation energy produced by knocking within cylinder number 6. Although a piezoelectric knock sensor is included in the preferred embodiment of the present invention, those having ordinary skill in the art will recognize that any knock sensor may be used with the present invention, so long as the knock sensor is capable of sensing vibrational energy produced by the designated cylinder. If sufficient space is available, the knock sensor can be mounted directly to the cylinder head combustion deck. If space is not available, a mounting adapter is required for the knock sensor.

FIGS. 3A–B illustrate in greater detail the knock sensor mounting adapter capscrew 14. The capscrew 14 includes a hexagonal head 20 coupled to a threaded shaft 22. The threaded shaft 22 screws into the cylinder head combustion deck 16 and also acts as the intake manifold 19 mounting capscrew. Within the hexagonal head 20 there is bored a threaded internal cavity 24. The knock sensor 12 incorporates a hollow bore 26 therethrough (see FIG. 4B). When the knock sensor is positioned on top of the hexagonal head 20. As illustrated in FIG. 1, the knock sensor is mounted to the hexagonal head 20 by means of a capscrew 28 which extends through the central bore 26 and threadingly engages the cavity 24, thereby securely holding the knock sensor 12 onto the mounting adapter capscrew 14. With such a secure mechanical connection between the knock sensor 12 and the cylinder head combustion deck 16, any mechanical vibrational energy produced by knocking within the cylinder will be transmitted to the knock sensor 12, which will produce a proportional voltage output to be sensed by the engine control module (ECM) controlling operation of the engine. In this manner, the ECM may periodically monitor the output of the knock sensor 12 and take appropriate action if the voltage output of the knock sensor 12 exceeds a predetermined threshold. Such appropriate action may include, for example, shutting down the engine and producing an indication to the operator of the engine that dangerous knocking is occurring.

By virtue of the above-described apparatus and engine operating methods, an internal combustion engine having wet sleeve replaceable cylinder liners may be protected from damaging knocking with the provision of only a single knock detector. Although the design of such an engine's block and cylinder heads precludes a single sensor from being able to sense vibrational energy from multiple cylinders, the set up of the engine that ensures that the sensed cylinder will exhibit knocking before any of the other engine cylinders effectively allows the entire engine to be monitored with only a single knock sensor. Such a system precludes the need for providing a knock detection sensor for every engine cylinder which, besides saving space due to the elimination of the multiple sensors, saves the cost of the additional sensors, the sensor mounting hardware, the harness leads, and the engine assembly time required to put such a system onto an engine. This savings equates to approximately $80 per cylinder, which is a significant savings on multiple-cylinder engines.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for knock detection in an internal combustion engine, comprising the steps of:
    a) providing an internal combustion engine having a plurality of cylinders, each said cylinder having a wet sleeve replaceable cylinder liner;
    b) providing a knock sensor operable to detect vibrational energy produced by knocking;
    c) applying said knock sensor to said engine in a vicinity of one of said plurality of cylinders such that said knock sensor will produce a first output when knocking occurs in said one cylinder;
    d) operating said engine in a manner such that said one cylinder is more prone to knock than any other of said plurality of cylinders;
    e) monitoring said knock sensor; and
    f) changing an operating state of said engine if said knock detector produces said first output.

2. The method of claim 1, wherein step (a) further comprises providing a turbocharged internal combustion engine.

3. The method of claim 1 wherein step (d) further comprises providing a wastegate for a first group of said plurality of cylinders, wherein said one cylinder is not included in said first group.

4. The method of claim 1, wherein step (d) further comprises advancing an ignition timing of said one cylinder with respect to any other of said plurality of cylinders.

5. The method of claim 1, wherein step (b) further comprises providing a piezoelectric knock sensor.

6. The method of claim 1, wherein step (c) further comprises applying said knock sensor to a cylinder head of said one cylinder.

7. The method of claim 6, wherein step (c) further comprises:
    c.1.) providing a mounting adapter;
    c.2.) coupling said mounting adapter to said cylinder head; and
    c.3.) coupling said knock sensor to said mounting adapter.

8. The method of claim 1, wherein step (e) further comprises:
    e.1.) providing an engine control module; and
    e.2.) coupling said knock sensor to said engine control module such that said engine control module is operative to detect said first output.

9. The method of claim 1, wherein step (f) further comprises using said engine control module to shut down said engine when said engine control module detects said first output.

10. The method of claim 1, wherein said first output comprises a voltage above a predetermined threshold.

11. The method of claim 1, wherein step (a) further comprises providing a natural gas fueled internal combustion engine having a plurality of cylinders, each said cylinder having a wet sleeve replaceable cylinder liner.

12. An apparatus for knock detection, comprising:
    an internal combustion engine having a plurality of cylinders, each said cylinder having a wet sleeve replaceable cylinder liner;
    an ignition system coupled to said engine for supplying a timed spark discharge to each of said plurality of cylinders, wherein an ignition timing of one of said plurality of cylinders is advanced with respect to any other of said plurality of cylinders, such that said one cylinder is more prone to knock than any other of said plurality of cylinders;
    a knock sensor coupled to said engine in a vicinity of said one cylinder such that said knock sensor is operable to detect vibrational energy produced by knocking in said one cylinder and to produce a first output in response thereto; and
    an engine control module coupled to said knock sensor and operable to detect said first output, and further coupled to said engine for controlling an operating state of said engine;

wherein said engine control module is operable to change said operating state in response to detecting said first output.

13. The apparatus of claim 12, wherein said knock sensor comprises a piezoelectric sensor.

14. The apparatus of claim 12, wherein said knock sensor is coupled to a cylinder head of said one cylinder.

15. The apparatus of claim 14, further comprising:

a mounting adapter coupled to said cylinder head;

wherein said knock sensor is coupled to said mounting adapter.

16. The apparatus of claim 12, wherein said engine control module is operable to shut down said engine in response to detecting said first output.

17. The apparatus of claim 12, wherein said first output comprises a voltage above a predetermined threshold.

18. The apparatus of claim 12, wherein said engine comprises a natural gas fueled internal combustion engine.

19. The apparatus of claim 12, wherein said engine is turbocharged.

20. An apparatus for knock detection, comprising:

an internal combustion engine having a plurality of cylinders, each said cylinder having a wet sleeve replaceable cylinder liner;

a turbocharger having a divided turbine housing having first and second exhaust inlet sections, wherein said first housing section is wastegated and said second housing section is non-wastegated;

a first exhaust manifold coupling a first group of said plurality of cylinders to said first housing section for flow of first exhaust gases;

a second exhaust manifold coupling a second group of said plurality of cylinders to said second housing section for flow of second exhaust gases;

a knock sensor coupled to said engine in a vicinity of said second group of cylinders such that said knock sensor is operable to detect vibrational energy produced by knocking in at least one of said second group of cylinders and to produce a first output response thereto; and an engine control module coupled to said knock sensor and operable to detect said first output, and further coupled to said engine for controlling an operating state of said engine;

wherein said engine control module is operable to change said operating state in response to detecting said first output.

* * * * *

UNITED STATES PATENT AND TRADEMARK OFFICE
CERTIFICATE OF CORRECTION

PATENT NO.    : 5,960,772
DATED         : October 5, 1999
INVENTOR(S)   : Tracy et al.

Page 1 of 1

It is certified that error appears in the above-identified patent and that said Letters Patent is hereby corrected as shown below:

Column 4,
Line 55, please change "GmtbH" to -- GmbH --.

Signed and Sealed this

Twenty-fifth Day of September, 2001

Attest:

*Attesting Officer*

NICHOLAS P. GODICI
*Acting Director of the United States Patent and Trademark Office*